US008418141B2

(12) United States Patent  
Baeumer et al.

(10) Patent No.: US 8,418,141 B2
(45) Date of Patent: Apr. 9, 2013

(54) SYNCHRONIZATION OF WORK SPACES

(75) Inventors: Dirk Baeumer, Zurich (CH); Erich Gamma, Gutenswil (CH); Tobias Kaspar Widmer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 12/166,032

(22) Filed: Jul. 1, 2008

(65) Prior Publication Data

US 2009/0019426 A1  Jan. 15, 2009

(30) Foreign Application Priority Data

Jul. 13, 2007 (EP) .................................. 07112441

(51) Int. Cl.
*G06F 9/44* (2006.01)
(52) U.S. Cl.
USPC ........... 717/122; 717/101; 717/110; 717/113; 717/121
(58) Field of Classification Search .................. 717/101, 717/110, 113, 120, 121
See application file for complete search history.

(56) References Cited

U.S. PATENT DOCUMENTS

| | | | |
|---|---|---|---|
| 6,804,682 B1 * | 10/2004 | Kemper et al. ....................... | 1/1 |
| 6,807,548 B1 * | 10/2004 | Kemper .................................. | 1/1 |
| 7,370,318 B1 * | 5/2008 | Howe et al. ..................... | 717/110 |
| 7,542,980 B2 * | 6/2009 | Tsyganskiy et al. ................. | 1/1 |
| 7,702,638 B2 * | 4/2010 | Tsyganskiy et al. ........ | 707/999.1 |
| 7,720,879 B2 * | 5/2010 | Tsyganskiy et al. .......... | 707/803 |
| 7,941,463 B2 * | 5/2011 | Tsyganskiy et al. .......... | 707/803 |
| 7,958,486 B2 * | 6/2011 | Tsyganskiy et al. .......... | 717/105 |
| 2006/0041625 A1 | 2/2006 | Chen et al. | |

OTHER PUBLICATIONS

Freese, T., Refactoring-Aware Version Control: Towards Refactoring Support in API Evolution and Team Development, ICSE'06 (May 20-28, 2006).*
Harold, E., Introducing Subversion, developerWorks (Jun. 6, 2006).*
Stiles, B. and Wogulis, J., Refactoring and Synchronization with the StarTeam Plug-in for Eclipse, DevCon (2005).*
Ekman, T. and Asklund, U, Refactoring-aware versioning in Eclipse, Elsevier (2004).*

(Continued)

*Primary Examiner* — Phillip H Nguyen
(74) *Attorney, Agent, or Firm* — Suiter Swantz pc llo

(57) ABSTRACT

A method is provided for synchronization of a first workspace with a second workspace. Both workspaces are connected to a version control system. The method comprises for a first refactoring operation being performed on the first workspace, performing first refactoring step, resulting in a modification of an object, storing the modification in a change information for the object, storing in a change information recording step the change information, and storing in a descriptor recording step refactoring information comprising information enabling execution of a refactoring corresponding to the first refactoring step during an update operation. The method further comprises for a commit operation, delivering in a change information delivery step the change information to the version control system, and delivering in a descriptor commit step the refactoring information to the version control system. Then the method comprises for the update operation being performed on the second workspace, retrieving into the second workspace in a load step from the version control system the change information and the refactoring information, performing a second refactoring operation using the refactoring information, and performing in an execution step an update of the object in the second workspace using the change information.

38 Claims, 2 Drawing Sheets

OTHER PUBLICATIONS

Johannes Henkel and Amer Diwan; "CatchUp! Capturing and Replaying Refactorings to Support API Evolution"; ICSE, 2005; pp. 1-10; Copyright 2005 ACM.

"Configuration Management and Refactorings in Eclipse"; printed from webpage http://www.lucas.lth.se/cm/cmeclipse.shtml, Jun. 12, 2008, pp. 1-2.

Danny Dig, et al.; "MolhadoRef: A Refactoring-aware Software Configuration Management Tool"; OOPSLA 2006, pp. 732-733.

"Unleashing the Power of Refactoring"; printed from website http://www.eclipse.org/articles/printable.php?file=Article-Unleashing-the-Power-of-Refactoring, Jun. 11, 2008; pp. 1-11.

Martin Fowler, et al., "Refactoring: Improving the Design of Existing Code", printed from webpage http://books.google.com/books?id=1MsETFPD3l0C, Jun. 17, 2008; pp. 1-2.

"What's New in Borland JBuilder 2005", a Borland White Paper, Sep. 2004, pp. 1-18.

\* cited by examiner

SYNCHRONIZATION OF WORK SPACES

CROSS-REFERENCE TO RELATED APPLICATIONS

The present application claims the benefit under 35 U.S.C. §119 of Switzerland; Application Serial Number 07112441.6, filed Jul. 13, 2007 entitled "SYCHRONIZATION OF WORK SPACES," which is incorporated herein by reference.

TECHNICAL FIELD

The present disclosure generally relates to the field of refactoring-aware synchronization of workspaces with VCS systems, and more particularly to a method of automatically applying refactorings during update operations to maintain consistency of artifacts.

BACKGROUND

A refactoring is a process for improving the design of software by applying several behavior-preserving transformations to a software system. M. Fowler, K. Beck, J. Brant, W. Opdyke and D. Roberts "Refactoring: Improving the Design of Existing Code", 1st edition, Addison Wesley, 1999, gives an introduction to the subject. A refactoring engine is a software development tool usually offered as a service by an integrated development environment (IDE) to provide automatic code transformations, such as reference-adjusting renaming of software elements or reorganizing hierarchies of software artifacts. Refactoring engines automate the refactoring process and help developers to safely change information. Current refactoring engines are designed to work on a local set of artifacts conventionally called a workspace. The scope of refactoring operations therefore is naturally bounded by such a workspace. Artifacts not present in the workspace at the time of initiating the refactoring cannot be considered and hence are not updated by the refactoring engine.

Most of the time software development is performed as a collaborative process. Therein, software developers only work on a subset of an entire software project. Consequently, such a developer typically has only a subset of all the artifacts of the entire project loaded in his workspace. The propagation of changes to a software artifact is then done by a Version Control System (VCS), which acts as a centralized repository that stores all artifacts belonging to a software project.

Current refactoring engines require that all artifacts to be refactored are present in the workspace from which the refactoring operation has been initiated. Other developers having artifacts with references to the refactored artifact in their workspace may have to perform manual adjustments when accepting incoming changes from the VCS system, since their content has not been updated by the refactoring engine. Due to the definition of the scope of a refactoring operation, the delivered change information does not comprise information on how to resolve conflicts in additional artifacts in workspaces other than the original workspace.

In T. Ekman and U. Asklund, "Refactoring-aware versioning in Eclipse", http://www.lucas.lth.se/cm/cmeclipse.shtml, describes previous work that has been done to enrich a VCS with refactoring information. However, this information is only leveraged during merge and compare operations and not to solve the consistency problem caused by the definition of the scope of refactoring operations performed by refactoring engines during update operations.

In J. Henkel and A. Diwan: "CatchUp! Capturing and Replaying refactorings to Support API Evolution. In ICSE", St. Louis, USA, 2005 the authors are describing a refactoring engine that is able to capture refactorings performed on a workspace, and then later replay the refactorings on a different workspace. This refactoring engine however is a standalone system which is not integrated in a VCS and does not support collaboration by software repositories.

Dig et al. present in D. Dig, T. N. Nguyen, and R. Johnson: "Refactoring-aware Software Configuration Management", Report No. UIUCDCS-R-2006-2710, April 2006 a refactoring-aware software configuration management system where change information is not stored as files, but as logical operations on source code. In conjunction with a refactoring engine which has been extended to record refactorings, this system stores refactorings as semantic operations in order to maintain a consistent history of a source code element. The semantic operations are then replayed on the workspace during update operations. This software configuration management system is a standalone solution which does not work with an existing resource-based VCS.

The Borland JBuilder 2005, described in Borland JBuilder 2005 Whitepaper, http://www.borland.com/resources/en/pdf/white_papers/jb2 005_whats_new.pdf, has support to record and replay refactorings. Refactoring information can be associated with a project archive from a project which is dependent on the project which the refactoring has been initiated from. This feature is called distributed refactoring, but does not leverage refactoring information during synchronization with a VCS.

In "CatchUp! Capturing and Replaying Refactorings to Support API Evolution" by Johannes Henkel and Amer Diwan, International Conference on Software Engineering, Proceedings of the 27th international conference on Software engineering St. Louis, Mo., USA, SESSION: Software evolution, Pages: 274-283, 2005, the creation of a meta data file containing refactoring information is described. Library developers who have to evolve a library to accommodate changing requirements often face a dilemma: Either they implement a clean, efficient solution but risk breaking client code, or they maintain compatibility with client code, but pay with increased design complexity and thus higher maintenance costs over time. A lightweight approach is discussed for evolving application programming interfaces (APIs), which does not depend on version control or configuration management systems. Instead, API refactoring actions are captured as a developer evolves an API. Users of the API can then replay the refactorings to bring their client software components up to date.

In the web article http://www.eclipse.org/articles/article.php?file=Article-Unleashing-the-Power-of-Refactoring/index.html, the author Tobias Widmer specifies how refactoring descriptors can be used to store refactorings for monitoring or later re-execution.

The challenge is the ability to extend an existing version control system to allow refactoring during an update operation.

SUMMARY

In accordance with the present invention, there is now provided a method for refactoring-aware synchronization with version control systems (VCS) capable of refactoring a second workspace controlled by a VCS system, containing dependent artifacts originally not part of a first workspace where the refactoring causing an outgoing change information has been recorded, the method comprising recording of refactorings performed on the first workspace, storing refactoring information associated with the outgoing change information to be delivered to the VCS system and recognizing and replaying refactorings associated with incoming changes during an update operation at the second workspace.

According to a first aspect of the invention a method is provided for synchronization of a first workspace with a second workspace. Both workspaces are connected to a version control system. The method comprises for a first refactoring operation being performed on the first workspace, performing first refactoring step, resulting in a modification of an object, storing the modification in a change information for the object, storing in a change information recording step the change information, and storing in a descriptor recording step refactoring information comprising information enabling execution of a refactoring corresponding to the first refactoring step during an update operation. The method further comprises for a commit operation, delivering in a change information delivery step the change information to the version control system, and delivering in a descriptor commit step the refactoring information to the version control system. Then the method comprises for the update operation being performed on the second workspace, retrieving into the second workspace in a load step from the version control system the change information and the refactoring information, performing a second refactoring operation using the refactoring information, and performing in an execution step an update of the object in the second workspace using the change information.

Hence the invention provides a method for refactoring-aware synchronization with a VCS system working in a development environment where several developers, also referred to as users, are collaborating and sharing artifacts via a VCS system. First, a developer makes a change consisting of refactorings to a first workspace. Second, the developer delivers the outgoing change information to the VCS system, which also stores refactoring information in addition to the change information. Third, another developer synchronizes a second workspace with the VCS system and receives the incoming change information. Fourth, that other developer accepts the incoming change information. Finally, the development environment uses the received refactoring information to replay the refactorings from the first workspace on the second workspace and also applies the incoming change information to that second workspace.

The refactoring information is a place to store refactorings as semantic operations and allows this refactoring information, during an update operation, to refactor artifacts which originally were not part of the first workspace where the refactoring has been recorded.

The method according to the present invention is particularly useful for large layered software systems which are developed by distributed teams. Refactorings performed on lower layers may cause changes which would normally break higher levels. Using the method according to the present invention allows such breaking changes to be adopted automatically by replaying refactorings associated with incoming changes. Regarding the integration into existing VCS systems which do not support meta-data to be associated with changes, the method according to the present invention proves to be particularly convenient, since the method in question does not require any meta-data storage facility, but also performs on file-based VCS systems without any meta-data capabilities. Another advantage of the method comprised in the present invention is the ability to selectively apply pending refactorings to the second workspace. Artifacts in the second workspace to be updated can therefore be gradually migrated to the state in the repository, since refactoring changes provide richer semantics and time information.

According to a second aspect of the invention a method is provided for synchronization of a first workspace with a second workspace, the workspaces being connected to a version control system. The method comprises at the first workspace for a first refactoring operation being performed on the first workspace, performing a first refactoring step that results in a modification of an object storing the modification in a change information for the object storing in a change information recording step the change information, and storing in a descriptor recording step refactoring information comprising information enabling execution of a refactoring corresponding to the first refactoring step during an update operation. The method further comprises for a commit operation, delivering in a change information delivery step the change information to the version control system, for being retrievable into the second workspace to update the object therein, and delivering in a descriptor commit step the refactoring information to the version control system, for being retrievable into the second workspace and usable for a second refactoring operation. This method covers the part of the process that takes place at the first workspace.

According to a third aspect of the invention a method is provided for synchronization of a first workspace, with a second workspace, both workspaces being connected to a version control system. The method comprises for an update operation being performed on the second workspace, retrieving into the second workspace in a load step from the version control system change information and refactoring information, wherein the change information comprises a modification of an object that resulted from a first refactoring step that was performed on the first workspace, and wherein the refactoring information comprises information enabling execution of a refactoring corresponding to the first refactoring step during the update operation. The method comprises also performing a second refactoring operation using the refactoring information, and performing in an execution step an update of the object in the second workspace using the change information. This method covers the part of the process that takes place at the second workspace.

According to a fourth aspect of the invention a computer program element is provided comprising computer program code means which, when loaded in a processor of a data processing system, configures the processor to perform the above described method.

According to a fifth aspect of the invention a computer program product is provided comprising a computer-readable medium embodying program instructions executable by a processor to perform the above described method.

The present invention also extends to a computer program element comprising computer program code means which, when loaded in a processor of a data processing system, configures the processor to perform a method for refactoring-aware synchronization including refactoring of dependent artifacts not part of the workspace where the refactoring has been originally recorded during update operations.

According to a sixth aspect of the invention a first refactoring engine VCS extension is provided being a part of a first workspace, adapted to deliver in a descriptor commit step refactoring information to a version control system, for being retrievable into a second workspace and usable for a second refactoring operation, wherein the refactoring information comprises information enabling execution of a refactoring corresponding to a first refactoring step during an update operation.

According to a seventh aspect of the invention a second refactoring engine VCS extension is provided being a part of a second workspace, adapted to receive from a second VCS client refactoring information, wherein the refactoring information comprises information enabling execution of a refactoring corresponding to a first refactoring step during an update operation and to determine under use of the refactoring information pending refactorings for the object in the second workspace associated with a change information, wherein the change information comprises a modification of an object that resulted from a first refactoring step that was performed on a first workspace.

The recording of refactorings comprises the detection of refactorings performed on a first workspace, the storage of refactoring information such as references to elements to be refactored, or other user-defined input in a first workspace, and the ability to associate recorded refactorings with a module of a VCS system. The first workspace can be structured to encompass a user or program data section and a meta-data area. The latter is a preferred place to store the refactoring information.

In a preferred embodiment of this invention, refactorings are tracked by the first refactoring engine module itself, which queries a particular refactoring operation for a refactoring descriptor describing its current state, and stores this information in refactoring histories organized per project directory. A refactoring is associated with the project containing the element to be refactored.

During a commit operation of outgoing changes to a VCS repository, an extension of the VCS system contributed by the refactoring engine, and therefore referred to as first refactoring engine VCS extension, queries for refactoring information of refactorings performed on artifacts which refactorings are part of the outgoing changes, and stores this refactoring information along with the change information in the VCS repository. Since the artifacts in a workspace are usually organized hierarchically in project directories, folders and files, the refactoring engine advantageously associates refactoring information with the project directory corresponding to the VCS module shared in the repository.

In a preferred embodiment of this invention, the refactoring engine maintains separate refactoring histories for each project directory corresponding to a VCS module. Upon commit operations, the refactoring engine VCS extension computes the project directories affected by the outgoing changes, queries the refactoring engine for the recorded refactoring information, and stores this information in conjunction with the actual change information in the repository.

During an update operation which computes the difference between the history file at the local workspace and the VCS repository, the refactoring engine VCS extension can present outgoing and incoming changes to the user for a possible selection or deselection of items within the change information. The changes can comprise both refactorings and traditional textual changes. The user can hence effectuate selective deliverance of outgoing changes or acceptance of incoming changes. This can be applied similarly for the commit operation.

During an update operation of incoming changes from a VCS repository, the second refactoring engine VCS extension first determines whether any refactoring information is associated with the incoming changes. In case there is such information available, the refactoring engine is asked to interpret this information, re-instantiate the original refactorings, and perform the refactorings on the workspace. After the execution of the refactorings, the incoming changes are merged with the workspace, and the workspace is now synchronized with respect to the incoming refactorings and textual changes.

In a preferred embodiment of this invention, this process of computing the differences of the workspace with the VCS system in terms of refactorings and textual changes, storing refactoring information associated with change information during commit, retrieving refactoring information and executing the associated refactorings before the update is implemented by a refactoring engine VCS extension using a synchronize hook, a commit hook and a pre-update hook offered by the underlying VCS system.

According to a second aspect of the invention, a computer program product comprising a computer-readable medium embodying program instructions executable by a processor to perform a method as described above is presented.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

The figures are illustrating.

DETAILED DESCRIPTION

Reference will now be made in detail to the subject matter disclosed, which is illustrated in the accompanying drawings.

Figure 1:
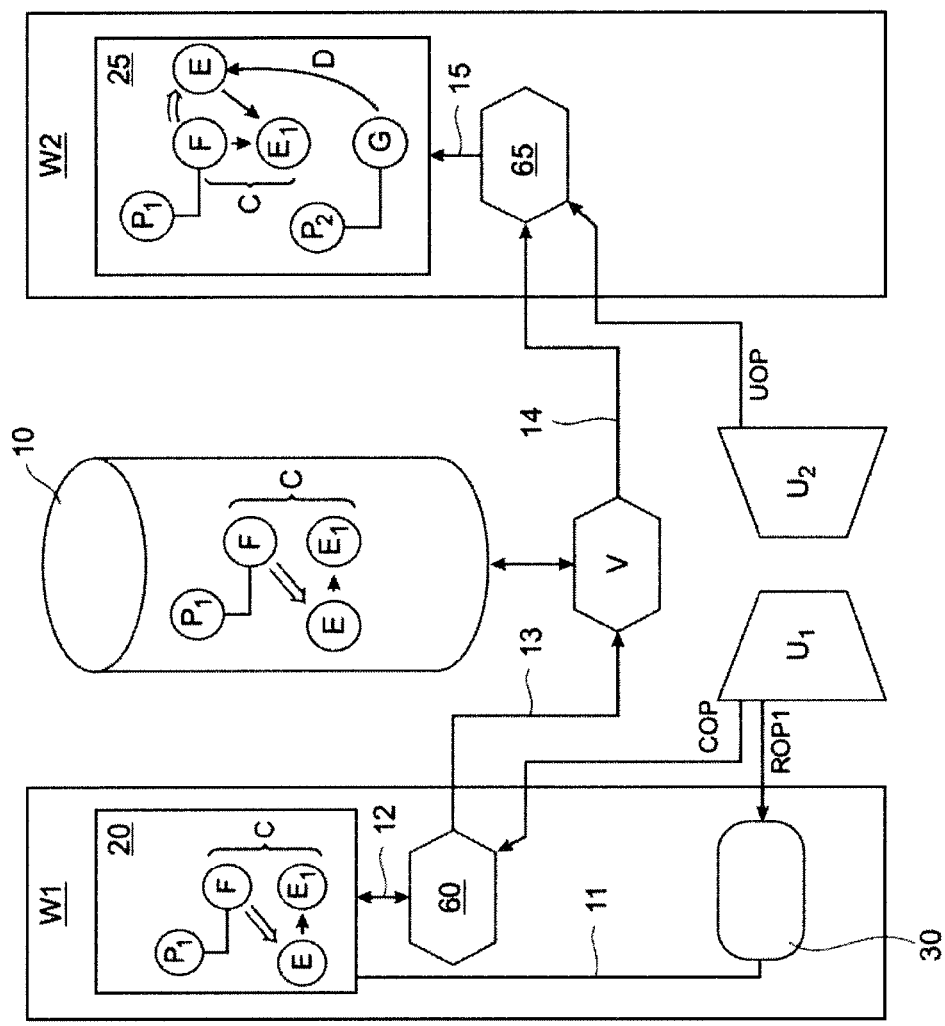
FIG. 1: a block diagram of a version control system without refactoring support.

FIG. 1 shows a schematic representation of a workspace arrangement where a method of version control can be performed. This arrangement comprises two development workspaces where software artifacts are organized in a hierarchical manner using project directories, folders and files. A first project P1 is stored in a first workspace memory 20 of a first workspace W1 and also in a second workspace memory 25 of a second workspace W2. The first project P1 is shared between both workspaces W1, W2, using a version control system V with an associated repository 10 to store version information for the first project P1.

The first workspace W1 contains here the first project P1 with a first file F. The first file F declares a first programming language element E, e.g. a function, or a class, or a STRUCT, etc. The first project P1 is shared with the version control system V and, without loss of generality, assumed to be in synchronized state. The second workspace W2 also contains the first project P1 with the first file F, shared with the version control system V and in synchronized state. The second workspace W2 additionally contains an unshared second project P2 with a second file G, whose content references the first programming language element E declared in the first file F in the first project P1. Hence, in the second workspace W2 the second project P2 has a dependency D on the first project P1. The first workspace W1 also comprises a first VCS client 60 and a first refactoring engine module 30. The second workspace W2 also comprises a second VCS client 65.

A first refactoring operation ROP1 can be triggered by a first user U1. As an example, here the first programming language element E declared in the first file F in the first project P1 of the first workspace W1 is renamed to E1 during a first refactoring step 11 executed by the first refactoring engine module 30 that belongs to the first workspace W1. The execution of the first refactoring step 11 results in a textual modification of the first file F in the first project P1 of the first workspace W1. This modification is stored in a change information C for the first file F, wherein this modification expresses itself as a character string change. Exemplarily here, also a purely textual change of the first file F is performed in that a comment is added thereto. Also this modification is stored in the same change information C.

In a commit operation COP that can be triggered by the first user U1, the first VCS client 60 retrieves the change information C in a retrieval step 12 from the first workspace memory 20 and delivers the change information C in a delivery step 13 via the version control system V to the repository 10. The change information C comprises essentially the information that a content change information has happened in the first file F, and also comprises the new content of the first file F. The change information delivery step 13 is performed by the first VCS client 60 that is functional at the first workspace W1.

In an update operation UOP that can be triggered by a second user U2, the change information C is loaded in a loading step 14 into the second VCS client 65 from the repository 10 of the version control system V. The change information C is applied in an execution step 15 by the second VCS client 65, such that the content of the first file F in the second workspace W2 is updated with the new content of the first file F stored in the repository 10, thereby reflecting the modifications contained in the change information C.

The first refactoring operation ROP1 has only produced the modifications in the change information C to update the content of the first file F to a new version in both workspaces W1, W2. The second VCS client 65 has no notion that one of the modifications in the change information C is stemming from a refactoring-type operation, namely here the renaming of the first programming language element E to E1, and hence has no means to make any corrections that are necessary from the first refactoring operation ROP1. Hence, after the update operation UOP in the second workspace W2 the first file F has a new content with the renamed first programming language element E1, but the reference from the second file G still points to the first programming language element E, which however no longer exists. This outdated reference to the first programming language element E will later lead to errors if it is not somehow corrected beforehand.

Figure 2:
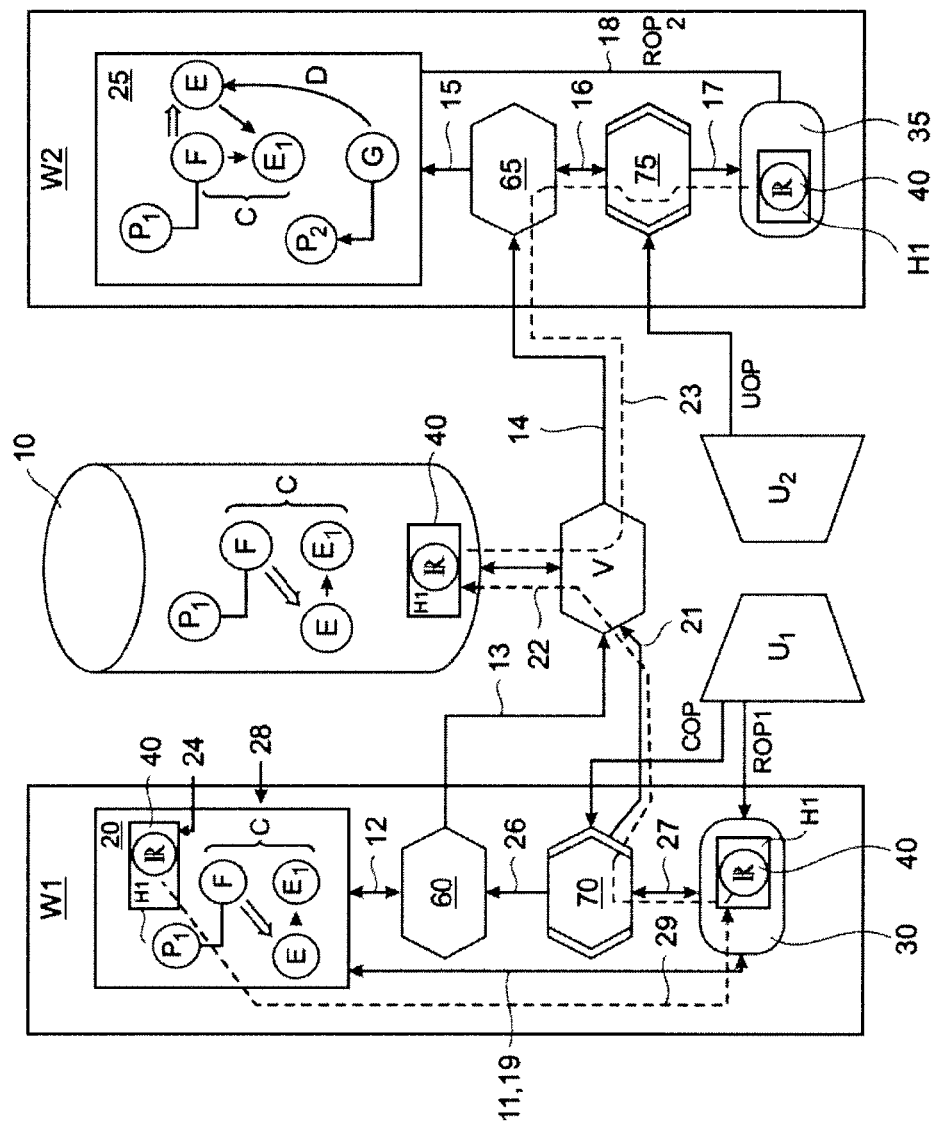
FIG. 2: a block diagram of an architecture of a refactoring-aware version control system.

FIG. 2 shows a schematic representation of a workspace arrangement where a method of refactoring-aware synchronization with a version control system can be performed. This arrangement comprises two development workspaces where software artifacts are organized in a hierarchical manner using project directories, folders and files. A first project P1 is stored in a first workspace memory 20 of a first workspace W1 and also in a second workspace memory 25 of a second workspace W2. The first project P1 is shared between both workspaces W1, W2, using a version control system V with an associated repository 10 to store version information for the first project P1.

The first workspace W1 contains here the first project P1 with a first file F containing a first programming language element E, all being objects within the first workspace W1. The first project P1 is shared with the version control system V and, without loss of generality, assumed to be in synchronized state. The second workspace W2 also contains as objects the first project P1 with the first file F containing the first programming language element E, shared with the version control system V and in synchronized state. The second workspace W2 additionally contains a second project P2, which can be shared or unshared, with a second file G, whose content references the first programming language element E in the first file F in the first project P1. Hence, in the second workspace W2 the second project P2 has a dependency D on the first project P1 via the first programming language element E. The first workspace W1 also comprises a first VCS client 60, a first refactoring engine VCS extension 70 and a first refactoring engine module 30. The second workspace W2 also comprises a second VCS client 65, a second refactoring engine VCS extension 75 and a second refactoring engine module 35.

The first refactoring engine VCS extension 70 is arranged with connections to both, the first refactoring engine module 30 and the first VCS client 60.

First Refactoring Operation

A first refactoring operation ROP1 can be triggered by a first user U1. As an example, the first programming language element E in the first file F in the first project P1 of the first workspace W1 is renamed to E1 during a first refactoring step 11 executed by the first refactoring engine module 30 that belongs to the first workspace W1. The execution of the first refactoring step 11 results in a textual modification of the first file F in the first project P1 of the first workspace W1. This modification is stored in a change information C for the first file F.

Exemplarily here, also a purely textual change of the first file F is performed in that a comment is added thereto. Also this modification is stored in the same change information C. That means, other modifications of the object P1, F are also stored in the change information C. Hence the change information C tells that the first file F has been changed to become a modified first file F*. This modification is not expressed in any semantic or logical way, instead it tells the amendment in the character string from the first file F to the modified first file F*. The change information C is stored in the first workspace memory 20 in a change information recording step 28.

Also, in a descriptor recording step 24 a refactoring information, hereinafter also referred to as refactoring descriptor 40, is generated by the first refactoring engine module 30 and stored in the first workspace memory 20. Hence the descriptor recording step 24 is executed by a first refactoring engine module 30 that is functional at the first workspace W1. The refactoring descriptor 40 comprises information about the first refactoring step 11. In this example, the refactoring descriptor 40 comprises information that the first programming language element E in the first file F has been renamed to E1 by means of a refactoring operation. Such refactoring descriptor 40 contains the information that allows to reconstruct and execute the corresponding refactoring during an update operation. For instance, such information includes the programming language element to be refactored, the time of the refactoring execution, an identifier of the refactoring type and the parameters specific to the refactoring type denoted by this identifier.

For the first refactoring operation ROP1 being performed on the first workspace W1, hence a first refactoring step 11 is performed, resulting in a modification of an object P1, F, the modification is stored in a change information C for the object P1, F, and in a change information recording step 28 the change information C is stored, and in a descriptor recording step 24 the refactoring information 40 comprising information enabling execution of a refactoring corresponding to the first refactoring step 11 during an update operation UOP, is stored The format of the refactoring descriptor 40 for the described embodiment here is for example specified by the XML markup language:

<?xml version="1.0" encoding="utf-8"?>
<session version="1.0">
<refactoring description="Rename language element E" id="rename.languageElement" nput="P1/F/E" name="E1" stamp="1150110478398" version="1.0"/> </session>

It hence contains the type of the refactoring operation (rename), and its parameters. In this embodiment this is a first parameter being the name of the object that is affected by this operation, i.e. the object (P1/F/E) that is renamed, another parameter specifying the new name of the object (El), and the timestamp telling when the operation has been executed. As an optional addition, here also a version number is given to accommodate for later updates in the descriptor syntax, by identifying its version, e.g. here 1.0. The refactoring descriptor 40 hence contains the identifying parameters for the refactoring that is the root of the corresponding modification contained in the change information C. While the change information C for any of its modifications only comprises the string change information, the refactoring descriptor 40 contains the semantic identification of the refactoring operation. The refactoring descriptor 40 is here written into a refactoring history file H1 that is associated with the first project P1. The refactoring information 40 is hence stored in a subfolder of a directory of the object P1.

Commit Operation

Next, a commit operation COP is triggered by the first user U1. Here, this triggering action is, in contrast to the embodiment depicted in FIG. 1, routed to the first refactoring engine VCS extension 70. The first refactoring engine VCS extension 70 causes two further steps: In a change information retrieval command step 26 the first VCS client 60 is triggered to perform a change information retrieval step 12. In a refactoring descriptor retrieval command step 27 the first refactoring engine module 30 is triggered to perform a descriptor retrieval step 19.

The first VCS client 60 retrieves the change information C in the change information retrieval step 12 from the first workspace memory 20 and delivers the change information C in a change information delivery step 13 via the version control system V to the repository 10. The change information C comprises essentially the information that the content of the first file F has changed to the modified first file F*, and also comprises the new content of the modified first file F*.

In the refactoring descriptor retrieval command step 27, the first refactoring engine module 30 is queried for the refactoring information 40 belonging to the outgoing change information C. In the descriptor retrieval step 19 the first refactoring engine module 30 retrieves the refactoring descriptor 40 from the first workspace memory 20, see dashed line 29 in FIG. 2, and delivers it to the first refactoring engine VCS extension 70, which in a descriptor commit step 21 delivers that refactoring descriptor 40 via the version control system V to the repository 10, see dashed line 22 in FIG. 2. The descriptor commit step 21 is performed by the first refactoring engine VCS extension 70 that is functional at the first workspace W1 and that is connected to the first VCS client 60 and the first refactoring engine module 30. The first refactoring engine VCS extension 70 makes here use of the standard functionality of the first refactoring engine module 30 to be able to retrieve the refactoring descriptor 40 belonging to a specific change information C for the first refactoring engine VCS extension 70. This allows to plug a first refactoring engine VCS extension 70 right into an existing system that comprises already a first VCS client 60 and a first refactoring engine module 30, while also modifying the existing first refactoring engine module 30 to offer the functionality to record and store the refactoring descriptor 40, or alternatively by replacing the existing first refactoring engine module 30 with another first refactoring engine module 30 that offers the functionality to record and store the refactoring descriptor 40. Alternatively the first refactoring engine VCS extension 70 can retrieve the refactoring descriptor 40 directly from the first workspace memory 20 if the first refactoring engine VCS extension 70 is equipped with that functionality.

The refactoring descriptor 40 is here serialized into the refactoring history file H1 located in the folder hierarchy of the project directory of the first project P1 in the repository 10. The refactoring history file H1, which preferably is a hidden file, lists the refactorings executed on the first project P1 in chronological order, using e.g. an XML markup similar to the example above depicting the XML markup of the refactoring descriptor 40. The advantage of this solution is the participation of the refactoring history file H1 in the update operation UOP, since the refactoring history file H1 can be processed by the update operation UOP of the version control system V in the same manner during merging of project directories, folders and files as any file with textual content. This allows the described method and the first refactoring engine VCS extension 70 to be connected with any existing type of first VCS client 60. A disadvantage would be that the change information C and the refactoring descriptor 40 are not stored as a logical unit and hence the first refactoring engine VCS extension 70 has the extra task to make sure that the corresponding pair of change information C and refactoring descriptor 40 are associated with each other.

Between the descriptor retrieval step 19 and the descriptor commit step 21, respectively between the change information retrieval step 12 and the change information delivery step 13 there is an optional step of allowing the first user U1 to intervene with the process. Therein the change information C can be presented to the first user U1 for deselection of items contained therein from being delivered in the change information delivery step 13. Also, therein the refactoring information 40 is presented to the first user U1 for deselection of items contained therein from being delivered in the descriptor commit step 21.

Any of the first VCS client 60, the first refactoring engine VCS extension 70, and the first refactoring engine module 30, can display as items to the first user U1 the modifications contained in the change information C and/or the refactoring descriptor 40. The first user U1 is then enabled to choose one of more of the displayed items to be deselected from the list of items before they are committed. Only the remaining selected items of the change information C and of the refactoring descriptor 40 will be further processed as outgoing changes to the repository 10. This way the first user U1 has a possibility to prevent modifications to be committed that the first user U1 does not desire. The refactoring descriptor 40 provides here the advantage that the first user U1 gets semantic information that describes what kind of operation will be executed, whereas the change information C will only disclose which file is subjected to a modification. It becomes clear that the information "change the first file F to become the modified first file F*" as reflected in the change information C is not as helpful to the first user U1 as the information "rename in the first file F the first programming language element E to E1" as reflected in the refactoring descriptor 40.

The intervention possibility can in a preferred embodiment also be implemented in a way that the first user U1 is presented with the change information C and the refactoring descriptor 40 at the same time, such that the first user U1 can perform the deselection/selection in a single step whereupon the change delivery step 13 and the descriptor commit step 21 are continued.

In summary for the commit operation COP, in the change information delivery step 13 the change information C is delivered to the version control system V, for being retrievable into the second workspace W2 to update the object P1, F therein, and in a descriptor commit step 21 the refactoring information 40 is delivered to the version control system V, for being retrievable into the second workspace W2 and usable for a second refactoring operation ROP2.

Update Operation: The second refactoring engine VCS extension 75 is arranged with connections to both, the second refactoring engine module 35 and the second VCS client 65.

An update operation UOP can be triggered by a second user U2. Here, this triggering action is, in contrast to the embodiment depicted in FIG. 1, routed to the second refactoring engine VCS extension 75. The second refactoring engine VCS extension 75 causes two further steps: In an update load command step 16 the second VCS client 65 is triggered to perform a load step 14. The load step 14 is performed by the second VCS client 65 that is functional at the second workspace W2. In a refactoring command step 17 the second refactoring engine module 35 is triggered to perform a second refactoring operation ROP2, comprising a second refactoring step 18.

In the load step 14, the change information C and the refactoring descriptor 40 are loaded into the second VCS client 65 from the repository 10 of the version control system V. The refactoring descriptor 40 is routed via the second refactoring engine VCS extension 75 to the second refactoring engine module 35, see dashed line 23 in FIG. 2.

At this point there is another optional step of allowing the second user U2 to intervene with the process. Therein the change information C can be presented to the second user U2 for deselection of items contained therein from being applied in the execution step 15. Also, the refactoring information 40 can be presented to the second user U2 for deselection of items contained therein from being used in the second refactoring operation ROP2.

Any of the second VCS client 65, the second refactoring engine VCS extension 75, and the second refactoring engine module 35, can display as items to the second user U2 the modifications contained in the change information C and/or the refactoring descriptor 40. The second user U2 is then enabled to choose one of more of the displayed items to be deselected from the list of items. Only the remaining selected items of the change information C and of the refactoring descriptor 40 will be further processed as incoming changes to the second workspace W2. This way the second user U2 has a possibility to prevent modifications that the second user U2 does not desire. The refactoring descriptor 40 provides also here the advantage that the second user U2 gets semantic information that describes what kind of operation will be executed, whereas the change information C will only disclose which file is subjected to a change information.

In the second refactoring step 18, the refactoring descriptor 40 is used to instantiate and execute a refactoring operation on the folders and files in the second workspace memory 25. Since in the refactoring descriptor 40 the renaming of the first programming language element E to E1 in the first file F is designated as part of a refactoring operation, the second refactoring step 18 produces a renaming not only of the first programming language element E, but also of the reference of the second file G towards that first programming language element E. Hereby the dependency D is updated.

At this point there is another optional step of allowing the second user U2 to intervene with the process. Any of the second VCS client 65, the second refactoring engine VCS extension 75, and the second refactoring engine module 35, can display as items to the second user U2 the modifications contained in the change information C. The second user U2 is then enabled to choose one of more of the displayed items to be deselected from the list of items. Only the remaining selected items of the change information C will be further processed as incoming changes to the second workspace W2. This way the second user U2 has a possibility to prevent modifications that the second user U2 does not desire. If this step is offered, the previous intervention possibility can be limited to the refactoring descriptor 40.

Then the change information C is merged into the execution step 15 by the second refactoring engine VCS extension 75 using basic commands from the second VCS client 65, such that the first file F in the second workspace W2 is updated with a new content, thereby reflecting the modifications contained in the change information C, depending on the relation between the change information C and the refactoring descriptor 40. The merge process is described further below in more detail.

The refactoring descriptor 40 is here obtained from a hidden refactoring history file H1 located in the folder hierarchy of the project directory of the corresponding project.

Next, the process at the second refactoring engine 35 is described in more detail. Without loss of generality, it is now assumed that there are several refactoring descriptors to be synchronized from the repository 10. Also, it is assumed that the system described here has a history, i.e. there have been refactoring-, commit-, and update-operations before and hence there is a refactoring history. This refactoring history leaves its traces in the system, namely, in that the refactoring operations have produced refactoring descriptors that are maintained in a refactoring history file at the respective entity. Hence for each project subjected to refactoring, there is a refactoring history file at the repository 10, hereinafter referred to as repository history file RH, and also a refactoring history file at the second workspace W2, hereinafter referred to as workspace history file WH. In the current embodiment the repository history file RH comprises the refactoring history file H1.

The repository history file RH is delivered together with the change information C to the second VCS client 65.

After the load step 14, the second refactoring engine VCS extension 75 first determines whether there are pending refactorings associated with the incoming change information C. The set of pending refactorings is computed by determining the difference between the received repository history file RH and the present workspace history file WH. In the example described above, the difference of the refactoring history of the first project P1 contains one incoming refactoring descriptor 40 for the performed first refactoring operation ROP1 which renamed the first programming language element E in the first file F to E1. Hence the first refactoring operation ROP1 is identified as a pending refactoring.

In this embodiment the second refactoring operation ROP2 is performed before the execution step 15. The second refactoring engine VCS extension 75 is arranged at the second workspace W2 to determine under use of the refactoring information 40 the pending refactorings for the object P1, F in the second workspace W2 associated with the change information C.

Then the second refactoring engine module 35 processes for the pending refactorings the refactoring descriptors 40 associated with the incoming change information C. The second refactoring engine module 35 processes the incoming refactoring descriptors 40 by examining the hidden refactoring history file H1. The refactoring descriptors 40 for the pending refactorings are hereinafter referred to as pending refactoring descriptors 40.

Then, the second refactoring engine module 35 examines the pending refactoring descriptors 40, checks whether a refactoring implementation to execute the pending refactoring described in the respective pending refactoring descriptor 40 is available. A refactoring implementation is here executable code, such as a component of a development environment (IDE). Such code is able to execute the transformation of the specified refactoring. If no refactoring implementation is found the refactoring descriptor is ignored and not selected for execution. The second user U2 can be informed of this situation.

Next, if more than one pending refactoring descriptor 40 exists, it sorts the pending refactoring descriptors 40 in ascending order of their time stamps, meaning that refactorings executed in the first refactoring operation ROP1 by the first refactoring engine module 30 are executed in the same order during the update operation UOP, respectively the second refactoring operation ROP2.

Third, the second refactoring engine module 35 sequentially executes the pending refactorings. This process must not necessarily be implemented as a transaction, but the method described here also supports the incremental execution of pending refactorings during the update operation UOP, i.e. allowing the second user U2 to deselect any of the presented refactorings. In a preferred embodiment, the pending refactorings are handled similarly as the incoming change information C, i.e. pending refactorings and incoming change information C are treated uniformly during the update operation UOP. The update operation UOP comprises a number of independent executions of pending refactorings, terminated by the updating of the second workspace W2 with the incoming change information C. In the case above, the second refactoring engine module 35 executes the second refactoring step 18 which renames the local version, in the second workspace W2, of the first programming language element E in the first file F of the first project P1 to E1. The second refactoring step 18 not only produces a change to rename the first programming language element E to E1, but also a change to adapt the reference to the first programming language element E in the second file G of the second project P2 of the second workspace W2 to E1. This results in all references to the first programming language element E in the second workspace W2 being refactored to E1 as well, thereby avoiding errors or inconsistencies.

Fourth, the incoming change information C is merged with the second workspace W2, i.e. it is executed by means of the second refactoring engine VCS extension 75 using the basic update, overwrite and merge commands from the second VCS client 65. The content change of the first file F in the first project P1 cannot be simply applied to the second workspace W2 using the second VCS client 65, since the second refactoring step 18 already caused a content change to the first file F in the first project P1 in the second workspace W2. Hence, to perform this change here would result in a merge conflict in the VCS client 65. The merge process to remedy this situation works as follows:

Therefore, an intersection set S is defined as the intersection of the files and folders modified by the change information C and also by the refactoring execution step 18. The intersection set S in the second workspace W2 contains here the first file F of the first project P1. For the merge process the following cases exist:

The intersection set S is empty. The refactoring engine VCS extension 75 can delegate the change execution to the second VCS client 65. The processing of the change information C is done within the execution step 15.

The intersection set S is not empty. It can be divided into two intersection subsets, a first intersection subset SN and a second intersection subset SO, such that the following holds: The first intersection subset SN contains all artifacts A from the intersection set S which did not have an outgoing change before the refactoring execution step 18. The second intersection subset SO contains all artifacts A from the intersection set S which had an outgoing change before the refactoring execution step 18. Outgoing changes are those changes that are pending for any object in the second workspace W2 which changes result from any kind of modification executed on that object before the second user U2 has triggered the update operation. Hence: SO=S−SN. The artifacts A from the intersection subsets SN and SO are processed as follows:

For the artifacts A contained in the first intersection subset SN a pseudo merge conflict arises. Since the same refactorings have been applied to both the first workspace W1 and the second workspace W2, the modifications comprised by the change information C are a superset of the modifications comprised by the second refactoring execution step 18. The second refactoring engine VCS extension 75 can apply the part of the change information C associated with the artifacts A in the first intersection subset SN to the second workspace W2. For the artifacts A in the first intersection subset SN, the second refactoring engine VCS extension 75 triggers an overwrite operation via the second VCS client 65 within the execution step 15. In other words for the concrete embodiment of the renaming of the first programming language element E, the refactoring operation described by the refactoring descriptor 40 has been executed in the refactoring execution step 18, thereby renaming the first programming language element E to E1, and inherently modifying the first file F to the content of the modified first file F*. Thereafter in the execution step 15 the change information C will replace the first file F with the modified first file F*, factually changing nothing since the content of the first file F was already that of the modified first file F*. Other changes that are not associated with refactoring operations, e.g. the insertion of the textual comment into the first file F1, are applied by the second VCS client 65 without activity of the second refactoring engine VCS extension 75 therefore. Hence the pseudo merge conflict is resolved automatically. The modifications created to the object P1, F by the second refactoring operation ROP2 are overwritten by modifications to the object P1, F created by the execution step 15.

For the artifacts A contained in the second intersection subset SO a real merge conflict arises, since they have one or more outgoing changes conflicting with one or more incoming changes. The second refactoring engine VCS extension 75 triggers a merge operation for all artifacts A in the second intersection subset SO via the second VCS client 65, possibly requiring user intervention, as is standard in existing VCS systems. One simple way to automate conflict resolution can be to alert the corresponding second user U2 of the conflict and to either automatically delete the conflicting changes, or to allow the second user U2 to select which of the changes shall be applied in which order.

Another possibility is to first conduct the execution step 15 and thereafter to execute the second refactoring step 18. In that scenario the change information C would be completely applied by the second VCS client 65 within the execution step 15, and thereafter the second refactoring engine VCS extension 75 would execute all pending refactorings by using the pending refactoring descriptors 40. The refactoring operation would not find the previous files and folders that have been changed in the execution step 15 such that those files and folders will be simply left alone by the second refactoring engine module 35. This method is still less preferred than the opposite order of steps since, at the example of the herein described embodiment finding any additional references to the first programming language element P/F/E can not be conducted with a normal compiler-based search mechanism because the original first programming language element P/F/E does no longer exist in the second workspace W2.

The first and second VCS extension 70, 75 hence are additional modules that enable the refactoring-aware synchronization in that they handle the communication of the refactoring descriptor 40 between the workspaces W1, W2 and the version control system V. The first refactoring engine VCS extension 70 is a part of a first workspace W1, adapted to deliver in the descriptor commit step 21 the refactoring information 40 to the version control system V, for being retrievable into the second workspace W2 and usable for the second refactoring operation ROP2 the refactoring information 40 comprises information enabling execution of a refactoring corresponding to the first refactoring step 11 during the update operation UOP.

The second refactoring engine VCS extension 75 is in particular arranged for controlling the performance of the second refactoring operation ROP2 and the execution step 15 relative to each other. Such control can comprises selecting the order of the steps to be performed and controlling their parameters. Here the second refactoring engine VCS extension 75 controls the retrieval of the refactoring descriptor 40, the decision which refactorings will be executed in the second refactoring operation ROP2 and which changes will be applied in the execution step 15. The second refactoring engine VCS extension 75 is arranged at the second workspace W2 to determine under use of the refactoring information 40 pending refactorings for the object P1, F in the second workspace W2 associated with the change information C. In particular, the second refactoring engine VCS extension 75 is adapted to receive via the second VCS client 65 the refactoring information 40, wherein the refactoring information 40 comprises information enabling execution of a refactoring corresponding to the first refactoring step 11 during the update operation UOP and to determine under use of the refactoring information 40 pending refactorings for the object P1, F in the second workspace W2 associated with the change information C, wherein the change information C comprises a modification of an object P1, F that resulted from the first refactoring step 11 that was performed on the first workspace W1.

The system has been described for a refactoring that is first executed in the first workspace W1, whose result is then transported onto the second workspace W2. However, the system can also be extended to enable this process to run in the opposite direction to allow bidirectional refactoring-aware synchronization. Therefor the respective components of the first workspace W1 and of the second workspace W2 are added in a mirrored fashion, i.e. to the first refactoring engine module 30 is added the functionality of the second refactoring engine module 35, and to the second refactoring engine module 35 is added the functionality of the first refactoring engine module 30. Similarly this is done for the first and second refactoring engine VCS extensions 70, 75, so they can both perform the commit operation COP and the update operation UOP. Then the first refactoring engine VCS extension 70 is arranged to also perform the functionality of the second refactoring engine VCS extension 75, and vice versa. Also the first and second VCS client 60, 65 are amended in a corresponding manner.

The refactoring descriptor 40 may alternatively associated with the change information C using the following approach: The refactoring descriptor 40 may be stored in the repository 10 as a meta-data extension to the change information C, i.e. refactoring information 40 is stored as meta-data associated with the change information C. The version control system V may therefore provide an explicit feature to attach additional information to a change information C that is delivered to the repository 10. This way the refactoring descriptor 40 and the change information C are automatically kept together which facilitates handling and reduces the amount of logic. The second refactoring engine module 35 interprets the incoming refactoring descriptors 40 by examining the meta-data extension to the change information C. As this is possible for the commit operation COP, it is also possible in the update operation UOP: If the version control system V supports a meta-data extension mechanism for changes, the refactoring descriptor 40 may be obtained from the change information C itself.

The system described works for any type and combination of refactoring operations. Also it can be extended to work between an arbitrary numbers of workspaces that share the same VCS. More particularly, although the embodiment has been described for one refactoring operation, it can be extended within the scope of the invention also to work with the following modifications: The change information C can also comprise the modifications to multiple files, such as several non-refactoring type modifications, and/or refactoring type modifications to one or more files. This can in an advantageous manner also comprise refactoring operations that effectuate modifications to several files. A typical scenario could be to group the refactoring descriptors of several refactorings executed in a row, e.g. during a refactoring session, into a single change information C. Another generalization applies to the commit operation. It is also possible to perform several commit operations on the first workspace W1 and only thereafter to execute one update operation on the second workspace W2. The update operation, in the load step 14, load all incidents of the change information C into the second workspace W2 for the update. So the load step 14 can load several pieces of change information C and several refactoring descriptors 40 into the second workspace W2 from the repository 10.

The method for synchronization of several workspaces may be implemented in part or as a whole in software or hardware or a combination thereof. The method may, implemented in hardware, be performed by a device for determining a malicious workload pattern. The method may, implemented in software, be performed by a computer program product. The computer program product may be provided on a computer readable medium embodying software instructions executable by a computer to perform the steps of the method. The computer-readable medium may, for example, be a CD-ROM, a DVD, a flash memory card, a hard disk, or any other suitable computer-readable medium, e.g. a storage medium within a network.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for bidirectional refactoring-aware synchronization between a first workspace (W1) and a second workspace (W2), said workspaces (W1, W2) being connected to a version control system (V), said workspaces (W1, W2) contain a project (P1) with a file (F), and said project (P1) is shared between said workspaces (W1, W2), the method comprising:
   a. for a first refactoring operation (ROP1) being performed by a first refactoring engine VCS extension on said first workspace (W1),
      i. performing a first refactoring step, resulting in a first modification of said file (F) of said project (P1), wherein said file (F) declares a programming language element, said programming language element is a function, a class, or a STRUCT,
      ii. storing the first modification in a change information (C) for said file (F) of said project (P1),
      iii. storing, in a change information recording step, said change information (C),
      iv. storing, in a descriptor recording step, refactoring information for a plurality of refactorings, the refactoring information comprising:
         the programming language element to be refactored,
         a time of a refactoring execution,
         an identifier of a refactoring type, and
         parameters specific to the refactoring type,
         said refactoring information enabling execution of a second refactoring operation (ROP2) corresponding to said first refactoring step during an update operation (UOP),
   b. for a commit operation (COP),
      i. delivering, in a change information delivery step, said change information (C) to said version control system (V),
      ii. delivering, in a descriptor commit step, said refactoring information to said version control system (V),
   c. for said update operation (UOP) being performed by a second refactoring engine VCS extension on said second workspace (W2),
      i. retrieving, into said second workspace (W2) in a load step from said version control system (V), said change information (C) and said refactoring information,
      ii. selecting an order of refactorings to be performed, from said plurality of refactorings to be performed,
      iii. performing said second refactoring operation (ROP2) using said refactoring information, resulting in a second modification of the file (F) of said project (P1),
      iv. performing, in an execution step, an update of the file (F) of said project (P1) in said second workspace (W2) using said change information (C), wherein said execution step operates to automatically resolve conflicts between modifications of said file (F) of said project (P1),
   d. for said bidirectional refactoring-aware synchronization, reversing a direction of the refactoring operations (ROP1, ROP2), the commit operation and the update operation wherein the second refactoring VCS extension may operates to update the first refactoring engine VCS extension.

2. A method according to claim 1, wherein the descriptor recording step (24) is executed by a first refactoring engine module that is functional at said first workspace (W1).

3. A method according to claim 1, wherein the refactoring information is stored in a subfolder of a directory of said object (P1, F).

4. A method according to claim 1, wherein the refactoring information is stored as meta-data associated with the change information (C).

5. A method according to claim 1, wherein the change information (C) is presented to a first user (U1) for deselection of items contained therein from being delivered in said change information delivery step.

6. A method according to claim 1, wherein the refactoring information is presented to a first user (U1) for deselection of items contained therein from being delivered in said descriptor commit step.

7. A method according claim 1, wherein the change information (C) is presented to a second user (U2) for deselection of items contained therein from being applied in said execution step.

8. A method according to claim 1, wherein the refactoring information is presented to a second user (U2) for deselection of items contained therein from being used in said second refactoring operation (ROP2).

9. A method according to claim 1, wherein each modification of said file (F) of said proiect (P1) is stored in said change information (C).

10. A method according to claim 1, wherein said second refactoring operation (ROP2) is performed before said execution step.

11. A method according to claim 1, wherein said change information delivery step is performed by a first Version Control System (VCS) client that is functional at said first workspace (W1).

12. A method according to claim 1, wherein said descriptor commit step is performed by a first refactoring engine VCS extension that is functional at said first workspace (W1) and that is connected to said first VCS client and said first refactoring engine module.

13. A method according to claim 1, wherein said load step is performed by a second VCS client that is functional at said second workspace (W2).

14. A method according to claim 1, wherein the second modification of the file (F) of said project (P1) by said second refactoring operation (ROP2) is overwritten by the update of said file (F) of said project (P1) by said execution step.

15. A method according to claim 1, wherein a second refactoring engine VCS extension is arranged at the second workspace (W2) to determine under use of the refactoring information pending refactoring for the file (F) of said project (P1) in said second workspace (W2) associated with the change information (C).

16. A method according to claim 15, wherein said second refactoring engine VCS extension is arranged for controlling the performance of said second refactoring operation (ROP2) and said execution step relative to each other.

17. A method according to claim 12, wherein said first refactoring engine VCS extension is arranged for controlling the performance of said second refactoring operation (ROP2) and said execution step relative to each other.

18. A system for bidirectional refactoring-aware synchronization between a first workspace (W1) and a second workspace (W2), said workspaces (W1, W2) being connected to a version control system (V), said workspaces (W1, W2) contain a project (P1) with a file (F), and said project (P1) is shared between said workspaces (W1, W2), the system comprising at least one processor configured to perform:
  a. for a first refactoring operation (ROP1) being performed by a first refactoring engine VCS extension on said first workspace (W1),
    i. performing a first refactoring step, resulting in a first modification of said file (F) of said project (P1), wherein said file (F) declares a programming language element, said programming language element is a function, a class, or a STRUCT,
    ii. storing the first modification in a change information (C) for said file (F) of said project (P1),
    iii storing, in a change information recording step, said change information (C),
    iv. storing, in a descriptor recording step, refactoring information for a plurality of refactorings, the refactoring information comprising:
      the programming language element to be refactored,
      a time of a refactoring execution,
      an identifier of a refactoring type, and
      parameters specific to the refactoring type,
    said refactoring information enabling execution of a second refactoring operation (ROP2) corresponding to said first refactoring step during an update operation (UOP),
  b. for a commit operation (COP),
    i. delivering, in a change information delivery step, said change information (C) to said version control system (V),
    ii. delivering, in a descriptor commit step, said refactoring information to said version control system (V),
  c. for said update operation (UOP) being performed by a second refactoring engine VCS extension on said second workspace (W2),
    i. retrieving, into said second workspace (W2) in a load step from said version control system (V), said change information (C) and said refactoring information,
    ii. selecting an order of refactoring to be performed, from said plurality of refactoring to be performed,
    iii. performing said second refactoring operation (ROP2) using said refactoring information, resulting in a second modification of the file (F) of said project (P1),
    iv. performing, in an execution step, an update of the file (F) of said project (P1) in said second workspace (W2) using said change information (C), wherein said execution step operates to automatically resolve conflicts between modifications of said file (F) of said project (P1),
  d. for said bidirectional refactoring-aware synchronization, reversing a direction of the refactoring operations (ROP1, ROP2), the commit operation and the update operation wherein the second refactoring VCS extension may operates to update the first refactoring engine VCS extension.

19. The system according to claim 18, wherein the descriptor recording step is executed by a first refactoring engine module that is functional at said first workspace (W1).

20. The system according to claim 18, wherein the refactoring information is stored in a subfolder of a directory of said file (F) of said project (P1).

21. The system according to claim 18, wherein the refactoring information is stored as meta-data associated with the change information (c).

22. The system according to claim 18, wherein the change information (C) is presented to a first user (U1) for deselection of items contained therein from being delivered in said change information delivery step.

23. The system according to claim 18, wherein the refactoring information is presented to a first user (U1) for deselection of items contained therein from being delivered in said descriptor commit step.

24. The system according to claim 18, wherein said change information delivery step is performed by a first VCS client that is functional at said first workspace (W1).

25. The system according to claim 18, wherein said descriptor commit step is performed by a first refactoring engine VCS extension that is functional at said first workspace (W1) and that is connected to said first VCS client and said first refactoring engine module.

26. The system according to claim 25, wherein the first refactoring engine VCS extension further configured for:
  being a part of a first workspace (W1), and
  delivering, in a descriptor commit step, refactoring information to a version control system (V), said refactoring information configured for being retrievable into a second workspace (W2) and usable for a second refactoring operation (ROP2), said refactoring information further comprises information enabling execution of a refactoring corresponding to a first refactoring step during an update operation (UOP).

27. A non-transitory computer-readable medium embodying program instruction executable by a processor to perform a method for bidirectional refactoring-aware synchronization between a first workspace (W1), with a second workspace (W2), said workspaces (W1, W2) being connected to a version control system (V), said workspaces (W1, W2) contain a project (P1) with a file (F), and said project (P1) is shared between said workspaces (W1, W2), the method comprising:
  a. for a first refactoring operation (ROP1) being performed by a first refactoring engine VCS extension on said first workspace (W1),
    i. performing a first refactoring step, resulting in a first modification of said file (F) of said project (P1), wherein said file (F) declares a programming language element, said programming language element is a function, a class, or a STRUCT,
    ii. storing the first modification in a change information (C) for said file (F) of said project (P1),
    iii storing, in a change information recording step, said change information (C),
    iv. storing, in a descriptor recording step, refactoring information for a plurality of refactorings, the refactoring information comprising:
      the programming language element to be refactored,
      a time of a refactoring execution,
      an identifier of a refactoring type, and
      parameters specific to the refactoring type,
  b. for a commit operation (COP),
    i. delivering, in a change information delivery step, said change information (C) to said version control system (V),
    ii. delivering, in a descriptor commit step, said refactoring information to said version control system (V), c. for an update operation (UOP) being performed by a second refactoring engine VCS extension on said second workspace (W2),
   i. retrieving, into said second workspace (W2) in a load step from said version control system (V), change information (C) and refactoring information and said refactoring information comprises information enabling execution of a second refactoring operation (ROP2) corresponding to said first refactoring step during said update operation (UOP),
   ii. selecting an order of refactorings to be performed, from said plurality of refactorings to be performed,
   iii. performing said second refactoring operation (ROP2) using said refactoring information, resulting in a second modification of the file (F) of said proiect (P1),
   iv. performing, in an execution step, an update of the file (F) of said project (P1) in said second workspace (W2) using said change information (C), wherein said execution step operates to automatically resolve conflicts between modifications of said file (F) of said project (P1),
d. for said bidirectional refactoring-aware synchronization, reversing the refactoring operations (ROP1, ROP2), the commit operation and the update operation wherein the second refactoring VCS extension may operates to update the first refactoring engine VCS extension.

28. The computer-readable medium according to claim 27, wherein the refactoring information is contained in a sub-folder of a directory of said file (F) of said project (P1).

29. The computer-readable medium according to claim 27, wherein the refactoring information is contained as meta-data associated with the change information (C).

30. The computer-readable medium according to claim 27, wherein the change information (C) is presented to a second user (U2) for deselection of items contained therein from being applied in said execution step.

31. The computer-readable medium according to claim 27, wherein the refactoring information is presented to a second user (U2) for deselection of items contained therein from being used in said second refactoring operation (ROP2).

32. The computer-readable medium according to claim 27, wherein the second modification of said file (F) of said project (P1) is contained in said change information (C).

33. The computer-readable medium according to claim 27, wherein said second refactoring operation (ROP2) is performed before said execution step.

34. The computer-readable medium according to claim 27 wherein said load step is accomplished by a second VCS client that is functional at said second workspace (W2).

35. The computer-readable medium according to claim 27, wherein the second modification to the file (F) of said project (P1) by said second refactoring operation (ROP2) is overwritten by the update of said file (F) of said project (P1) by said execution step.

36. The computer-readable medium according to claim 27, wherein a the second refactoring engine VCS extension is arranged at the second workspace (W2) to determine under use of the refactoring information pending refactorings for the file (F) of said project (P1) in said second workspace (W2) associated with the change information (C).

37. The computer-readable medium according to claim 36, wherein said second refactoring engine VCS extension is arranged for controlling the performance of said second refactoring operation (ROP2) and said execution step relative to each other.

38. The computer-readable medium according to claim 37, wherein the second refactoring engine VCS extension further configured for:
   being a part of a second workspace (W2);
   receiving, from a second VCS client, refactoring information, wherein said refactoring information comprises information enabling execution of a refactoring corresponding to a first refactoring step during an update operation (UOP) controlling the execution of the refactoring by a second refactoring operation (ROP2);
   controlling the performance of an execution step by a second VCS client applying said change information (C); and
   determining under use of said refactoring information pending refactorings for the file (F) of said project (P1) in said second workspace (W2) associated with a change information (C), wherein said change information (C) comprises a modification of the file (F) of said project (P1) that resulted from a first refactoring step performed on a first workspace (W1).

* * * * *